United States Patent
Laupp (10) Patent No.: US 10,118,530 B2
(45) Date of Patent: Nov. 6, 2018

(54) LIFT SYSTEM

(71) Applicant: Charles Laupp, Glen Burnie, MD (US)

(72) Inventor: Charles Laupp, Glen Burnie, MD (US)

( * ) Notice: Subject to any disclaimer, the term of this patent is extended or adjusted under 35 U.S.C. 154(b) by 0 days.

(21) Appl. No.: 15/481,017

(22) Filed: Apr. 6, 2017

(65) Prior Publication Data
US 2018/0290871 A1    Oct. 11, 2018

(51) Int. Cl.
*B60P 9/00* (2006.01)
*B60P 3/00* (2006.01)
*B60R 9/06* (2006.01)
*B66F 9/12* (2006.01)

(52) U.S. Cl.
CPC ........ *B60P 3/00* (2013.01); *B60R 9/06* (2013.01); *B66F 9/12* (2013.01)

(58) Field of Classification Search
CPC ........ B60P 1/4421; B60P 1/4442; B60R 9/06; B62B 2203/10; B62B 5/0003; A61G 3/062; B66C 23/44
USPC ......... 187/236; 414/462, 471, 495, 500, 540
See application file for complete search history.

(56) References Cited

U.S. PATENT DOCUMENTS

| | | | | |
|---|---|---|---|---|
| 2,598,489 A * | 5/1952 | Bayer | ........................ | B62B 1/14 187/244 |
| 3,907,138 A * | 9/1975 | Rhodes | ..................... | B62B 1/14 414/448 |
| 4,034,878 A * | 7/1977 | Fox | ........................... | B62B 3/04 414/448 |
| 5,026,244 A * | 6/1991 | Dorn | ........................ | A61G 3/02 414/540 |
| 5,180,275 A * | 1/1993 | Czech | ....................... | A61G 3/06 187/200 |
| 5,368,130 A * | 11/1994 | Wilke | ........................ | B66B 9/16 187/236 |
| 5,662,451 A | 9/1997 | Muzzi et al. | | |
| 5,975,831 A | 11/1999 | Martin | | |
| 6,312,210 B1 * | 11/2001 | Lang | ......................... | B60R 9/06 224/570 |
| 6,461,095 B1 | 10/2002 | Puska | | |
| 6,579,055 B1 * | 6/2003 | Williams | .................. | B60P 3/07 224/497 |
| 6,626,748 B2 | 9/2003 | Homer, Sr. | | |
| 6,638,001 B1 | 10/2003 | McKinley | | |
| 6,732,892 B1 | 5/2004 | Mangrum | | |
| 6,769,858 B1 * | 8/2004 | Butler | .................... | B60P 1/4421 414/462 |
| 6,869,265 B2 | 3/2005 | Smith et al. | | |
| 7,296,959 B2 | 11/2007 | Davis | | |
| 7,351,027 B2 * | 4/2008 | Ruch | ..................... | B60P 1/4421 414/540 |
| D606,724 S | 12/2009 | Weaver | | |
| 7,896,604 B1 | 3/2011 | Donlin et al. | | |
| 8,556,280 B1 * | 10/2013 | Latimer | ................ | B62B 5/0023 280/47.28 |

(Continued)

*Primary Examiner* — Gregory W Adams (57) ABSTRACT

A lift system for lifting and transporting harvested game includes an all terrain vehicle that may be driven. The all terrain vehicle has a back end and a lift unit is coupled to the back end of the all terrain vehicle. The lift unit is selectively positioned in a lowered position. Harvested game is positioned on the lift unit when the lift unit is in the lowered position. The lift unit is selectively positioned in a lifted position to lift the harvested fame. In this way the all terrain vehicle is facilitated to transport the harvested game.

11 Claims, 6 Drawing Sheets

(56) References Cited

U.S. PATENT DOCUMENTS

| | | | |
|---|---|---|---|
| 8,911,195 B2 * | 12/2014 | Derrick | B60P 3/122 414/462 |
| 9,139,214 B2 * | 9/2015 | Rich | B62B 3/0606 |
| 2005/0002769 A1 * | 1/2005 | Scheibel | B60P 1/4428 414/540 |
| 2005/0079037 A1 * | 4/2005 | Boyd | B60P 1/4421 414/462 |
| 2010/0290876 A1 * | 11/2010 | Conatser | B60P 1/4421 414/471 |
| 2014/0308101 A1 * | 10/2014 | Brutsaert | B60R 9/06 414/462 |

* cited by examiner

LIFT SYSTEM

BACKGROUND OF THE DISCLOSURE

Field of the Disclosure

The disclosure relates to lift devices and more particularly pertains to a new lift device for lifting and transporting harvested game.

SUMMARY OF THE DISCLOSURE

An embodiment of the disclosure meets the needs presented above by generally comprising an all terrain vehicle that may be driven. The all terrain vehicle has a back end and a lift unit is coupled to the back end of the all terrain vehicle. The lift unit is selectively positioned in a lowered position. Harvested game is positioned on the lift unit when the lift unit is in the lowered position. The lift unit is selectively positioned in a lifted position to lift the harvested fame. In this way the all terrain vehicle is facilitated to transport the harvested game.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
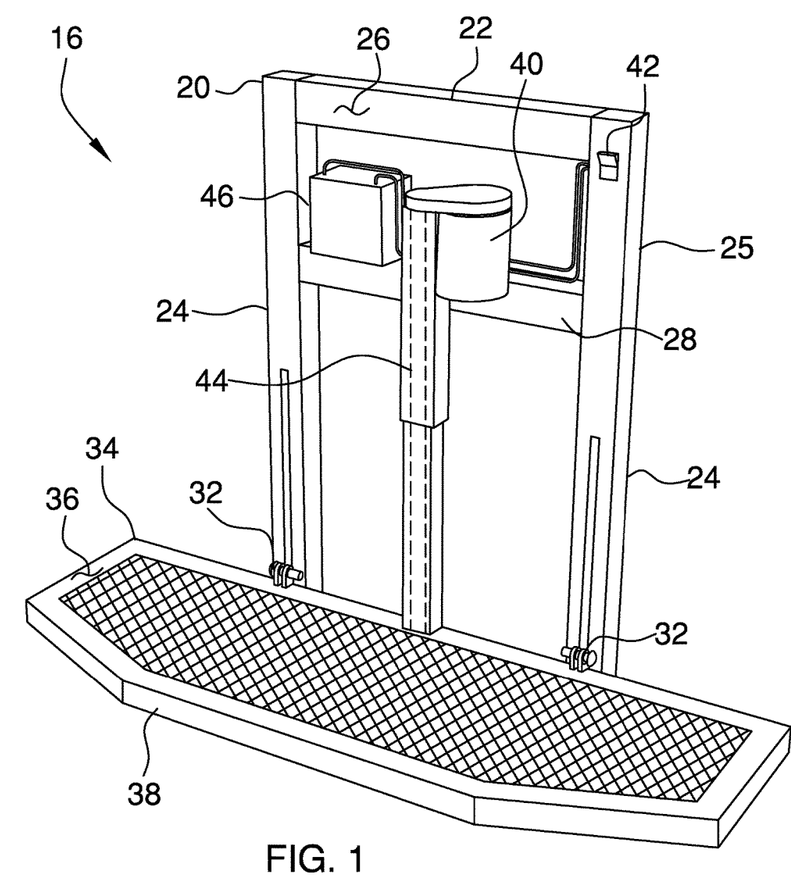
FIG. 1 is a front perspective view of a lift unit of a lift system according to an embodiment of the disclosure.
Figure 2:
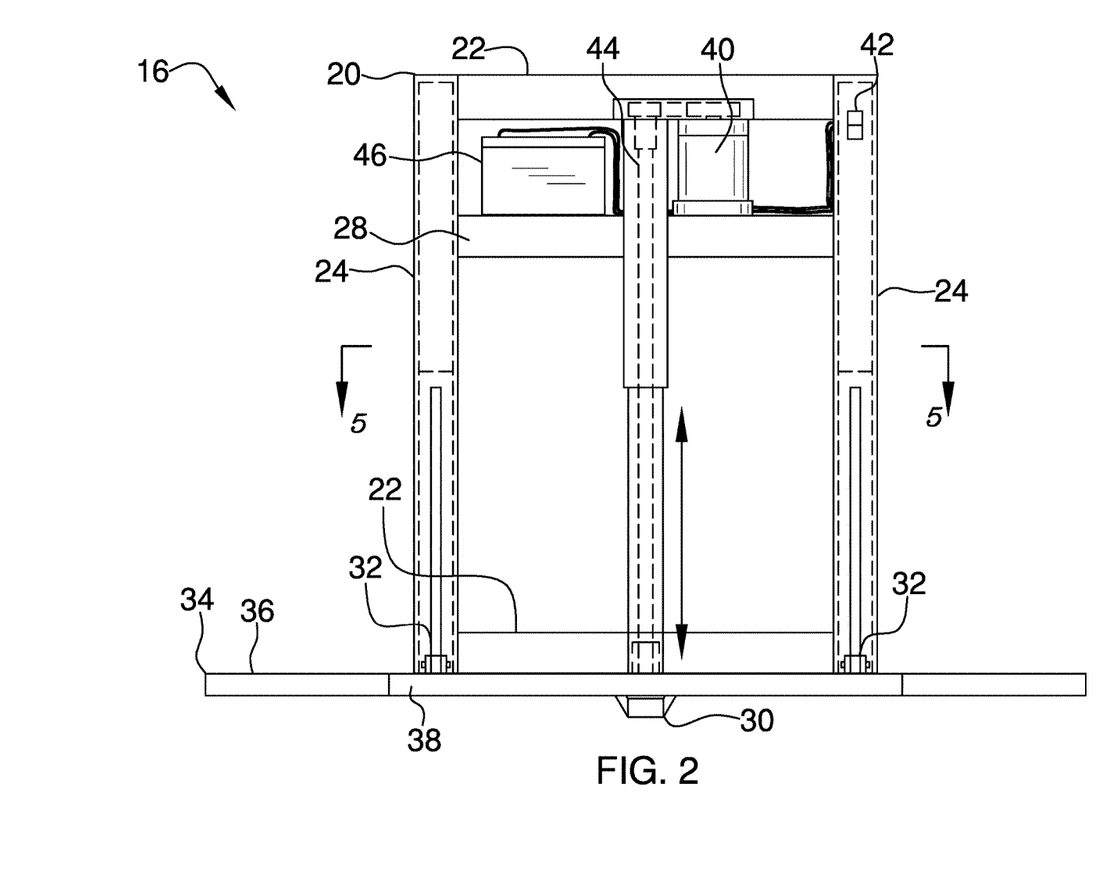
FIG. 2 is a front phantom view of a lift unit of an embodiment of the disclosure.
Figure 3:
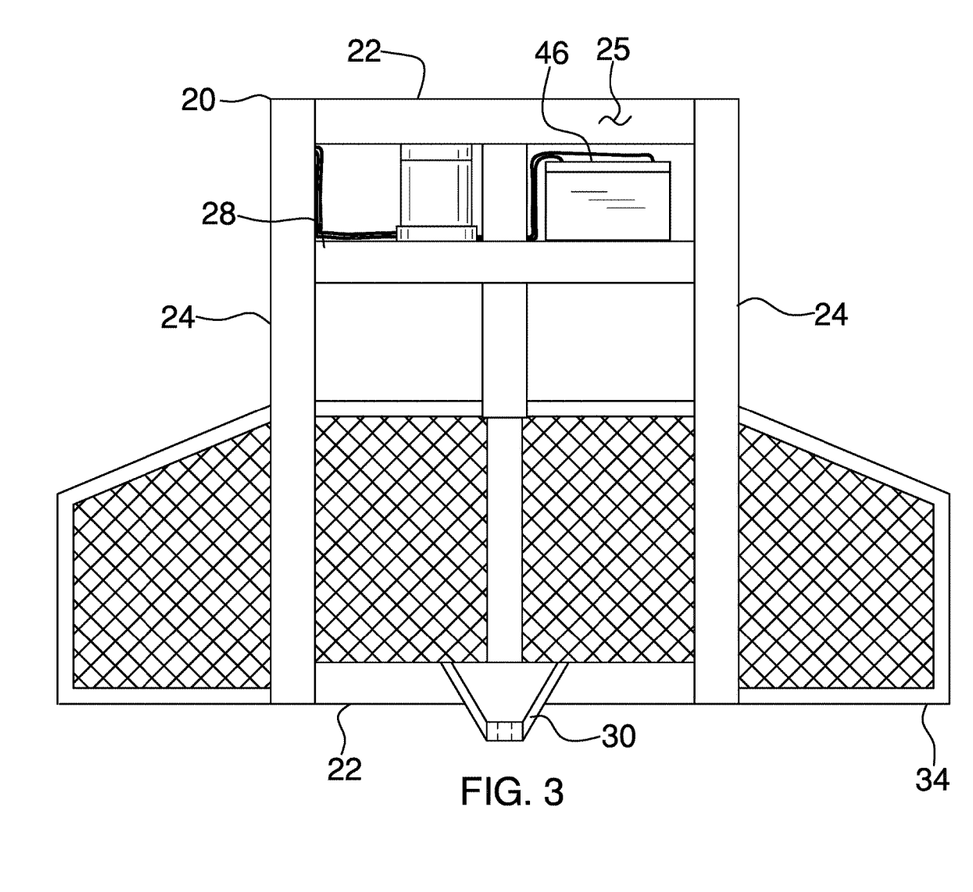
FIG. 3 is a back view of a lift unit of an embodiment of the disclosure showing a plate in a second position.
Figure 4:
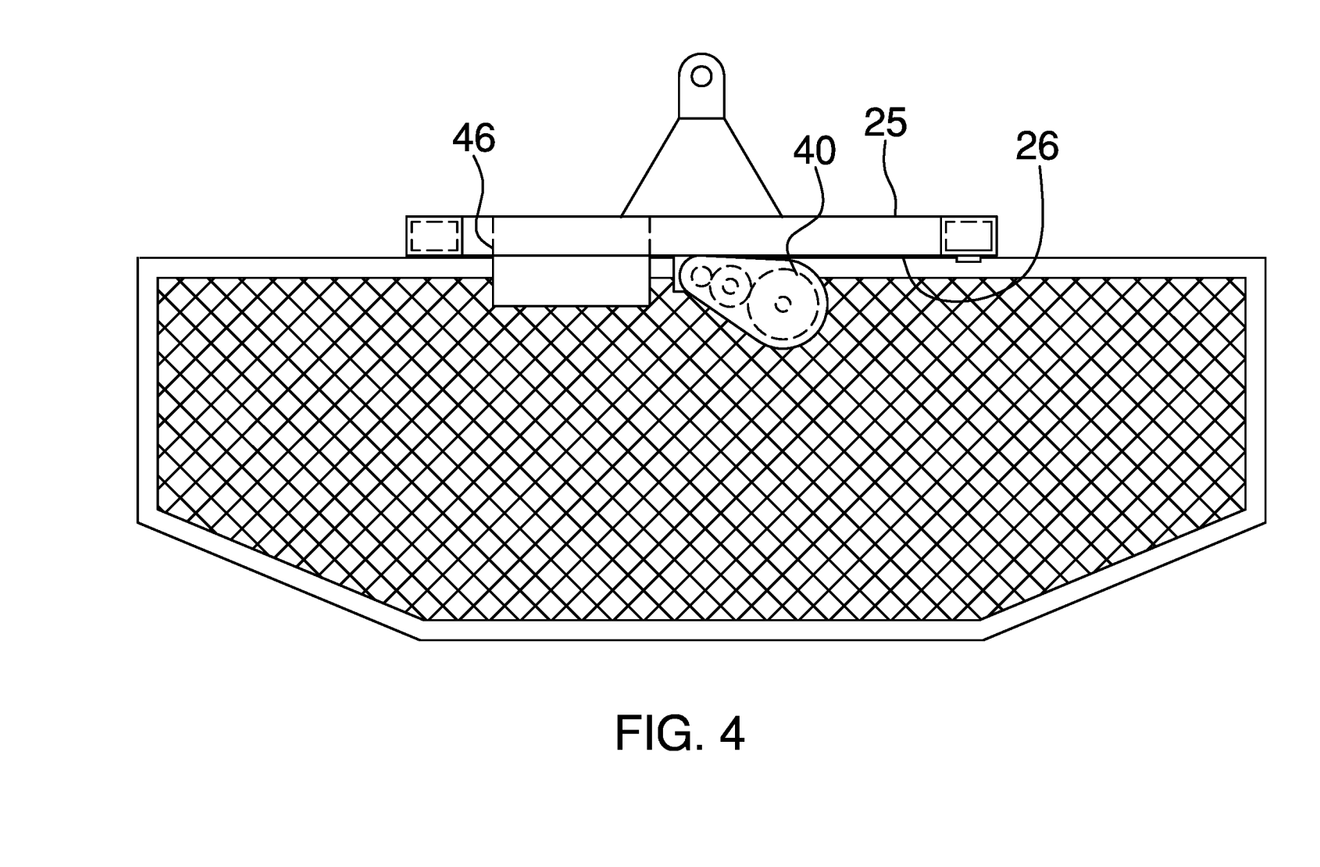
FIG. 4 is a top view of an embodiment of the disclosure.
Figure 5:
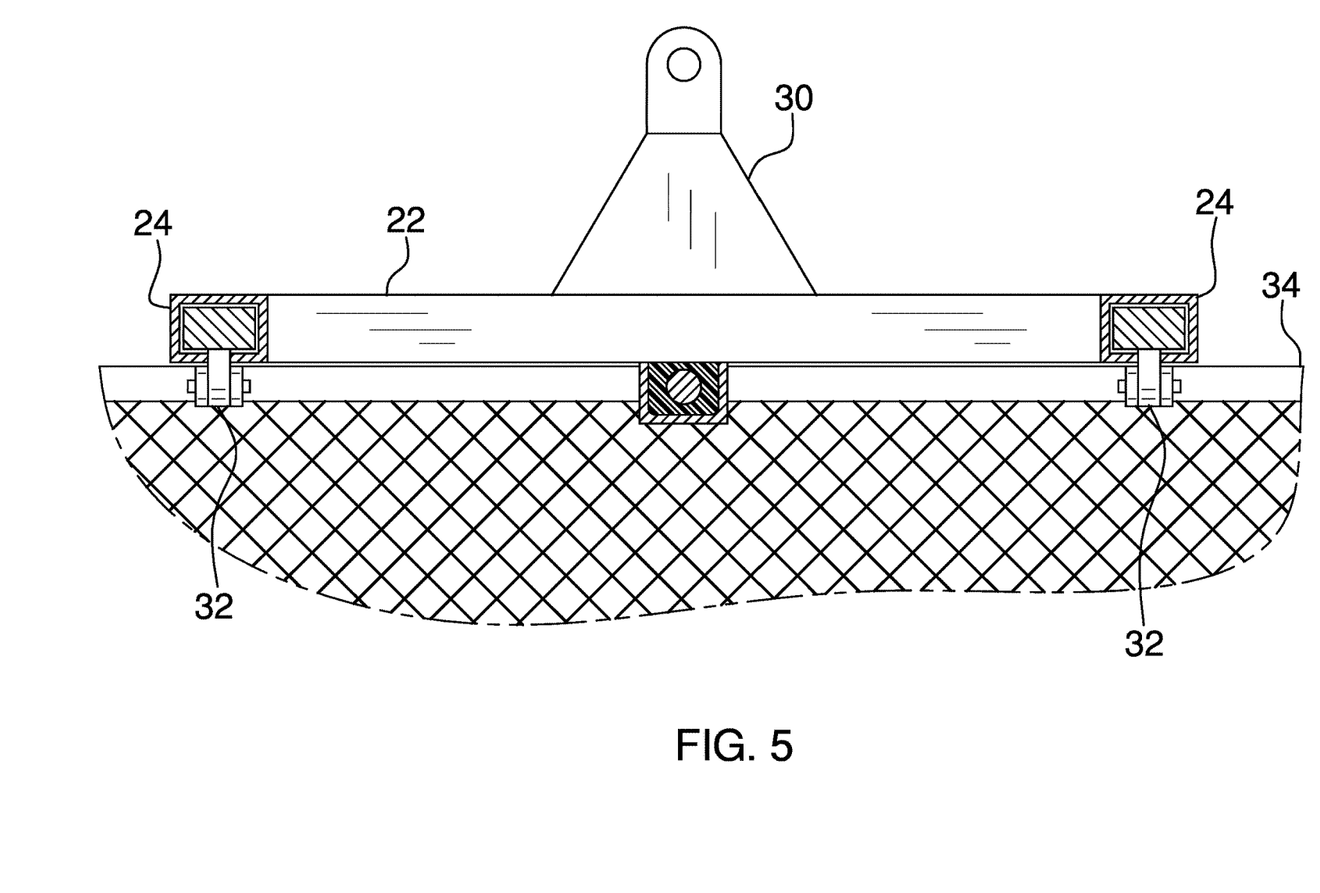
FIG. 5 is a cross sectional view taken along line 5-5 of FIG. 2 of an embodiment of the disclosure.
Figure 6:
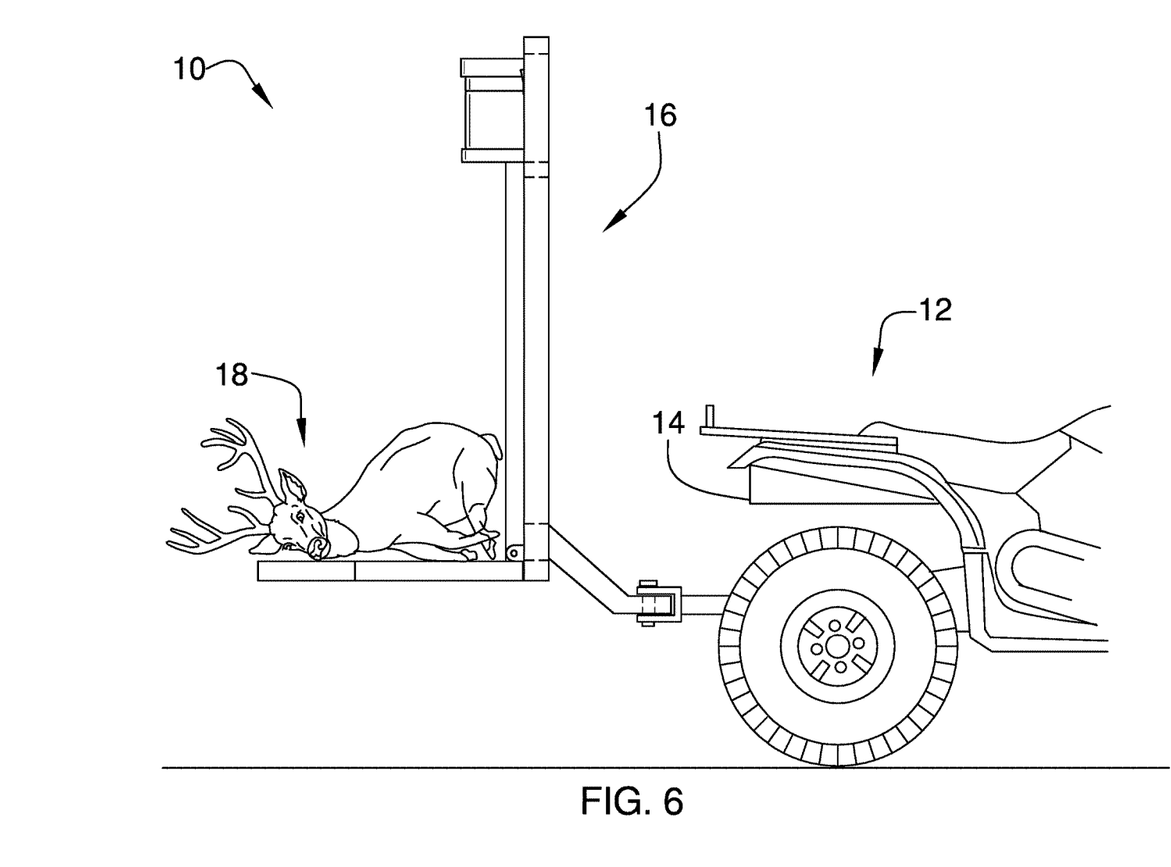
FIG. 6 is a perspective in-use view of an embodiment of the disclosure.

With reference now to the drawings, and in particular to FIGS. 1 through 6 thereof, a new lift device embodying the principles and concepts of an embodiment of the disclosure and generally designated by the reference numeral 10 will be described.

As best illustrated in FIGS. 1 through 6, the lift system 10 generally comprises an all terrain vehicle 12 that is selectively driven. The all terrain vehicle 12 has a back end 14 and the all terrain vehicle 12 may be a quad, a three wheeler or any other type of off road vehicle. A lift unit 16 is provided and the lift unit 16 is coupled to the back end 14 of the all terrain vehicle 12. The lift unit 16 is selectively positioned in a lowered position to have harvested game 18 positioned thereon. The harvested game 18 may be a deer, an antelope or any other wild animal that is too heavy for an individual to carry. The lift unit 16 is selectively positioned in a lifted position to facilitate the all terrain vehicle 12 to transport the harvested game 18. In this way a single person may lift and transport the harvested game 18.

The lift unit 16 comprises a frame 20 is that selectively coupled to the all terrain vehicle 12. The frame 20 has a pair of first members 22 each extending between a pair of second members 24. The first members 22 are spaced apart from each other such that the frame 20 has a rectangular shape and the frame 20 has a first surface 25 and a second surface 26. The frame 20 may have a height ranging between approximately 35.0 cm and 50 cm and a width ranging between approximately 50.0 cm and 75.0 cm.

A support 28 extends between the second members 24 and the support 28 is positioned between the first members 22. A hitch 30 is coupled to and extends away from the first surface 25 corresponding to a bottom one of the first members 22. The hitch 30 is selectively coupled to the back end 14 of the all terrain vehicle 12 having the frame 20 being vertically oriented. The hitch 30 may be a pin hitch, a pintle hitch or any other conventional type of hitch 30.

A pair of hinges 32 is provided and each of the hinges 32 is slidably coupled to the second surface 26 corresponding to an associated one of the second members 24. Each of the hinges 32 is slidable along a substantial length of the associated second member 24. Each of the hinges 32 may include a member that is slidably positioned within the associated second member 24. A plate 34 is provided that has a first surface 36 and a peripheral edge 38 and the peripheral edge 38 is coupled to each of the hinges 32. The plate 34 is selectively positioned in a first position having the plate 34 is horizontally oriented. Additionally, the plate 34 is selectively positioned on a second position having the plate 34 being vertically oriented. The harvested game 18 is selectively placed on the first surface 25 when the plate 34 is in the first position.

A motor 40 is provided and the motor 40 is coupled to the support 28. The motor 40 selectively rotates in a first direction and a second direction. Additionally, the motor 40 may be a one horsepower electric motor 40 or the like. A button 42 is coupled to the frame 20 and the button 42 is electrically coupled to the motor 40. The button 42 selectively turns the motor 40 on to selectively rotate in the first direction and the second direction.

A worm gear 44 is rotatably coupled between the motor 40 and the first surface 25 of the plate 34. The worm gear 44 urges the plate 34 to travel downwardly along the frame 20 when the motor 40 rotates in the first direction. In this way the lift unit 16 is positioned in the lowered position. The worm gear 44 urges the plate 34 to travel upwardly along the frame 20 when the motor 40 rotates in the second direction. In this way the lift unit 16 is positioned in the lifted position.

The worm gear 44 may be positioned within a sleeve having a plurality of telescopic sections. The motor 40 and the worm gear 44 may have a lifting capacity ranging between 65.0 kg and 115.0 kg. A power supply 46 is coupled to the support 28 and the power supply 46 is electrically coupled to the motor 40. The power supply 46 comprises at least one battery.

In use, the button 42 is manipulated to position the lift unit 16 in the lifted position and the all terrain vehicle 12 is driven to the harvested game 18. The button 42 is manipulated to position the lift unit 16 in the lowered position such that the plate 34 is aligned with the ground. The harvested game 18 is lifted onto the first surface 25 of the plate 34 and the button 42 is manipulated to position the lift unit 16 in the lifted position. The all terrain vehicle 12 is driven to transport the harvested game 18 to a selected destination. In this way a single individual can lift and transport harvested game 18. The hitch 30 is uncoupled from the all terrain vehicle 12 at any selected time to remove the lift unit 16 from the all terrain vehicle 12.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lift system being configured to selectively lift and transport harvested game, said system comprising:
   an all terrain vehicle being configured to be driven, said all terrain vehicle having a back end; and
   a lift unit being coupled to said back end of said all terrain vehicle, said lift unit being selectively positioned in a lowered position wherein said lift unit is configured to have harvested game positioned thereon, said lift unit being selectively positioned in a lifted position wherein said lift unit is configured to facilitate said all terrain vehicle to transport the harvested game, said lift unit comprising
      a frame being selectively coupled to said all terrain vehicle, said frame having a pair of first members each extending between a pair of second members, said first members being spaced apart from each other such that said frame has a rectangular shape, said frame having a first surface and a second surface,
      a support extending between said second members, said support being positioned between said first members,
      a motor being coupled to said support, said motor selectively rotating in a first direction and a second direction,
      a plate being slidably coupled to said frame, said plate having a first surface; and
      a worm gear being rotatably coupled between said motor and said first surface of said plate.

2. The system according to claim 1, further comprising a hitch being coupled to and extending away from said first surface corresponding to a bottom one of said first members, said hitch being selectively coupled to said back end of said all terrain vehicle having said frame being vertically oriented.

3. The system according to claim 1, further comprising a pair of hinges, each of said hinges being slidably coupled to said second surface corresponding to an associated one of said second members.

4. The system according to claim 3, further comprising a plate having a first surface and a peripheral edge, said peripheral edge being coupled to each of said hinges.

5. The system according to claim 4, wherein said plate is selectively positioned in a first position having said plate being horizontally oriented.

6. The system according to claim 4, wherein said plate is selectively positioned on a second position having said plate being vertically oriented, said first surface being configured to have the harvested game selectively placed thereon when said plate is in said first position.

7. The system according to claim 1, further comprising a button being coupled to said frame wherein said button is configured to be manipulated, said button being electrically coupled to said motor, said button selectively turning said motor on to selectively rotate in said first direction and said second direction.

8. The system according to claim 1, wherein said worm gear urges said plate to travel downwardly along said frame when said motor rotates in said first direction thereby facilitating said lift unit to be positioned in said lowered position.

9. The system according to claim 1, wherein said worm gear urges said plate to travel upwardly along said frame when said motor rotates in said second direction thereby facilitating said lift unit to be positioned in said lifted position.

10. The system according to claim 1, further comprising a power supply being coupled to said support, said power supply being electrically coupled to said motor, said power supply comprising at least one battery.

11. A lift system being configured to selectively lift and transport harvested game, said system comprising:
    an all terrain vehicle being configured to be driven, said all terrain vehicle having a back end; and
    a lift unit being coupled to said back end of said all terrain vehicle, said lift unit being selectively positioned in a lowered position wherein said lift unit is configured to have harvested game positioned thereon, said lift unit being selectively positioned in a lifted position wherein said lift unit is configured to facilitate said all terrain vehicle to transport the harvested game, said lift unit comprising:
       a frame being selectively coupled to said all terrain vehicle, said frame having a pair of first members each extending between a pair of second members, said first members being spaced apart from each other such that said frame has a rectangular shape, said frame having a first surface and a second surface,
       a support extending between said second members, said support being positioned between said first members,
       a hitch being coupled to and extending away from said first surface corresponding to a bottom one of said first members, said hitch being selectively coupled to said back end of said all terrain vehicle having said frame being vertically oriented, a pair of hinges, each of said hinges being slidably coupled to said second surface corresponding to an associated one of said second members, a plate having a first surface and a peripheral edge, said peripheral edge being coupled to each of said hinges, said plate being selectively positioned in a first position having said plate being horizontally oriented, said plate being selectively positioned on a second position having said plate being vertically oriented, said first surface being configured to have the harvested game selectively placed thereon when said plate is in said first position, a motor being coupled to said support, said motor selectively rotating in a first direction and a second direction, a button being coupled to said frame wherein said button is configured to be manipulated, said button being electrically coupled to said motor, said button selectively turning said motor on to selectively rotate in said first direction and said second direction, a worm gear being rotatably coupled between said motor and said first surface of said plate, said worm gear urging said plate to travel downwardly along said frame when said motor rotates in said first direction thereby facilitating said lift unit to be positioned in said lowered position, said worm gear urging said plate to travel upwardly along said frame when said motor rotates in said second direction thereby facilitating said lift unit to be positioned in said lifted position, and a power supply being coupled to said support, said power supply being electrically coupled to said motor, said power supply comprising at least one battery.

* * * * *